Sept. 14, 1943.  W. H. BASELT  2,329,510
FRICTION ABSORBING DEVICE
Filed Feb. 19, 1941  2 Sheets-Sheet 1
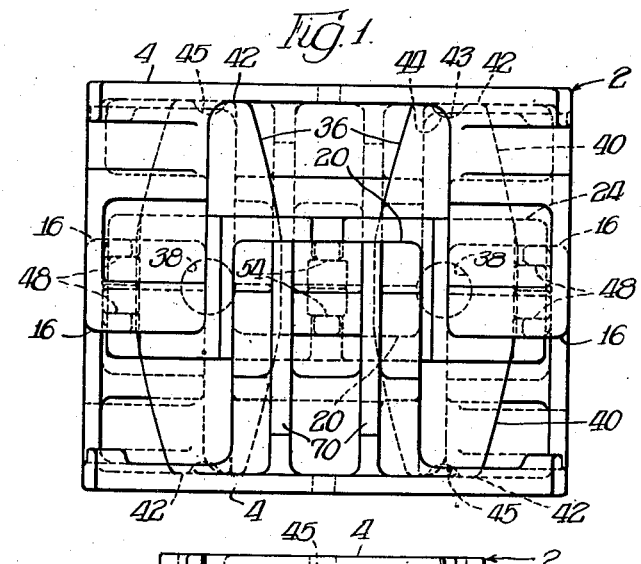
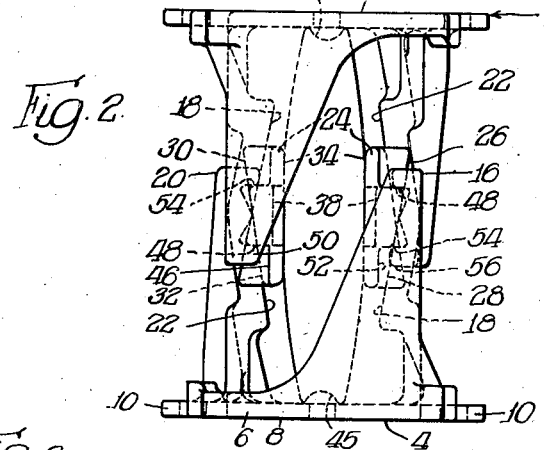
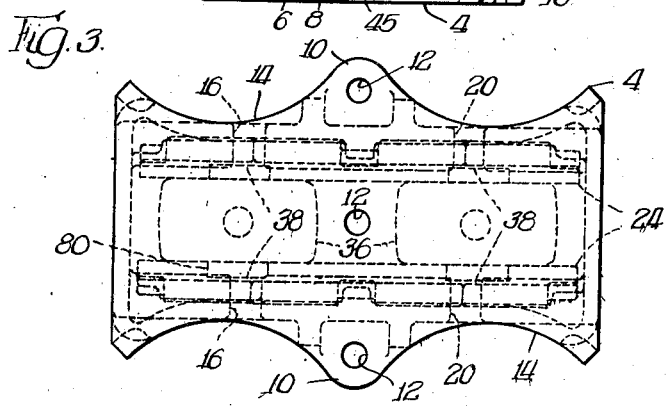
INVENTOR.
Walter H. Baselt,
BY

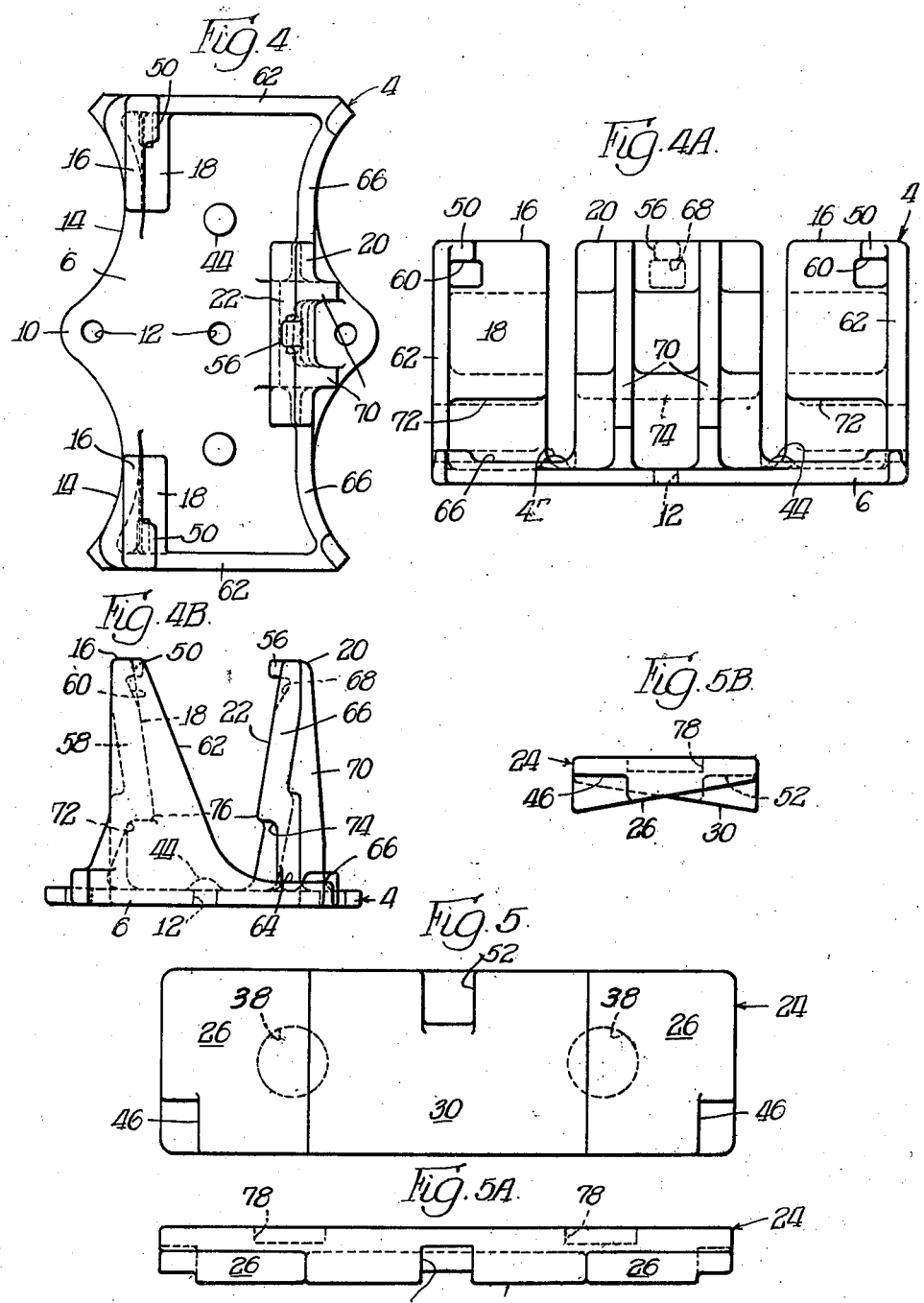

Patented Sept. 14, 1943

2,329,510

UNITED STATES PATENT OFFICE 2,329,510

FRICTION-ABSORBING DEVICE

Walter H. Baselt, Chicago, Ill., assignor to American Steel Foundries, Chicago, Ill., a corporation of New Jersey Application February 19, 1941, Serial No. 379,605

28 Claims. (Cl. 267—9)

My invention relates to friction absorbing devices and more particularly to a device wherein identical end followers and friction shoes are urged into tight frictional engagement by resilient means under compression between said followers and said shoes.

My invention includes a novel form of friction device suitable for use in spring groups having relatively long spring travel and presenting surfaces of maximum area on the followers and the shoes for frictional engagement.

A general object of my invention is to design such a friction absorbing device which may be utilized in a bolster supporting spring group for snubbing and preventing synchronous and harmonious vibrations of said group.

An object of my invention is to design an energy absorbing device including end followers each having spaced friction surfaces opposed to corresponding surfaces on the other follower, and friction shoes each urged into engagement with a plurality of friction surfaces on one follower and a friction surface on the other follower by resilient means interposed between said shoes and said followers.

Another object of my invention is to design such a friction absorbing device wherein each end follower presents spaced friction surfaces arranged substantially along one diagonal plane and an opposed intermediate friction surface disposed along an oppositely directed diagonal plane.

A further object of my invention is to design such a friction device wherein each friction shoe presents substantially all the area of one of its faces for complementary diagonal face engagement with the associated end followers.

A different object of my invention is to devise interlocking means for such a device to retain it in assembly, and I accomplish this by affording at each end of said device interengaging means between each shoe and one of said followers and intermediate said ends other interengaging means between each shoe and the other of said followers.

A specific object of my invention is to design a friction absorbing device wherein opposed identical end followers present opposing alternately arranged diagonal friction surfaces for complementary engagement with horizontally extending friction shoes which are urged into tight engagement with said followers by spaced resilient means having abutment with said shoes and said followers.

My invention contemplates a friction device adapted to be associated with relatively movable supported and supporting members and includes spaced resilient elements affording relatively long moment arms to resist out-of-square movement of said members and to restore them to their normal square relationship.

My invention comprehends a friction device wherein a plurality of resilient means not only urge sets of friction elements into tight engagement but also react against one of said sets to return said elements to their normal released positions.

In the drawings,

Figure 1 is a side elevation of my novel friction absorbing device.

Figure 2 is an end elevation of said device and Figure 3 is a top plan view thereof.

Figures 4, 4A and 4B show in detail one of the end followers used in the device shown in Figure 1, Figure 4 being a top plan view of said follower, Figure 4A being a side elevation thereof, and Figure 4B being an end view thereof.

Figures 5, 5A and 5B show details of a friction shoe used in the device shown in Figure 1, Figure 5 being a side view thereof, Figure 5A being a top view of the shoe shown in Figure 5, and Figure 5B being an end view taken from the left of Figure 5.

My novel friction absorbing device generally indicated at 2 may be of generally rectangular form and includes identical end followers 4, 4. Each end follower 4 comprises a base plate 6 presenting a substantially flat outer face 8 and having on opposite longitudinal edges central outwardly projecting lugs 10, 10. The base 6 and the lugs 10, 10 may be perforated as at 12, 12 to afford convenient means for securing said followers between two relatively movable members such as a bolster and a side frame. On opposite sides of each lug 10 the edges of said base are arcuately formed as at 14, 14 to afford a convenient and compact arrangement when said device is associated with a bolster supporting spring group. It will be understood, of course, that the followers may be secured to respective top and bottom spring plates or caps so that the spring group and friction device will act and may be handled as a unit.

Along one side of each base 6 and adjacent to its ends may be formed upstanding pedestals or friction walls 16, 16, presenting downwardly and inwardly directed diagonally arranged friction surfaces 18, 18. Along the opposite side of said plate 6 and intermediate the end pedestals 16, 16 may be formed an upstanding central pedestal or friction wall 20 presenting an opposed downwardly and inwardly directed diagonal friction surface 22. When the followers 4, 4 are assembled in operative position each central pedestal 20 is accommodated between the spaced end pedestals 16, 16 on the other follower, and the friction surfaces 18, 18 and 22 on respective followers are arranged in opposed relationship. It may also be noted that in assembly the diagonal friction surfaces 18, 18 and 22, 22 on said followers are alternately arranged or interleaved with each other, and that the diagonal friction surface 22 on each central pedestal 20 is oppositely directed with respect to the adjacent diagonal friction surfaces 18, 18 on the end pedestals 16, 16 of the other follower.

Extending horizontally and centrally of said device are friction shoes 24, 24, each having adjacent to its ends diagonal friction faces 26, 26 in complementary engagement as at 28, 28 with the friction surfaces 18, 18 on one of said followers. Intermediate its ends each friction shoe 24 is formed with an oppositely directed diagonal friction face 30 for complementary face engagement as at 32 with the friction surface 22 on the central pedestal 20 of the other follower.

Interposed between said shoes 24, 24 and seated in abutment thereagainst as at 34, 34 are the spaced resilient members 36, 36 which may be positioned thereon as at 38, 38. Each resilient member 36 may be formed of any suitable resilient material such as rubber composition and is afforded tapering end portions as at 40, 40 seated in abutment as at 42, 42 against the inner surfaces of the bases 6, 6. On each end is a recess 43 which accommodates a lug 44 on the inner surface of the base 6 for positioning said resilient member as at 45.

Each end of each friction shoe 24 may be notched or recessed as at 46 to interlock as at 48 with a lug 50 formed adjacent to the free end of each pedestal 16. Intermediate its ends each shoe is notched or recessed as at 52 to afford interlocking engagement as at 54 with a lug 56 formed adjacent to the free end of the central pedestal 20 on the other follower. The interlocking engagements at 48, 48 and 54, 54 of said shoes with said followers retain said device in assembly.

The manner in which the shoes and followers co-operate with each other may best be understood from a consideration of the detailed structure of each follower and each shoe.

In Figures 4, 4A and 4B are shown details of one of the end followers 4. Each follower 4 is of generally rectangular form with the longitudinal edges of the base 6 formed with the aforedescribed outwardly projecting central lugs 10, 10 and with arcuate edges 14, 14 on opposite sides of each lug 10. Each end pedestal 16 may be formed with a relatively thick friction wall 58 relieved as at 60 beneath the lug 50 for frictional wear of the diagonally arranged surface 18. At each end of the follower is integrally formed with each pedestal 16 and the base 6 a vertical reinforcing wall 62 which tapers downwardly from the top of pedestal 16 and terminates in a beaded portion 64 adjacent to the opposite longitudinal edge of the base 6. The beaded portion 64 continues along the opposite longitudinal edge of the base 6 as at 66 for reinforcement and merges with the central pedestal 20. The central pedestal 20 is also afforded a relatively thick friction wall 66 presenting on its outer face the previously described diagonally arranged friction surface 22, said wall 66 being relieved as at 68 beneath the retaining lug 56 for frictional wear of the surface 22. On its opposite side the central pedestal 20 is reinforced by spaced vertical ribs 70, 70. Adjacent to the base 6 the end pedestals 16, 16 and the central pedestal 20 may be undercut or relieved as at 72, 72 and 74 respectively for wear of the respective friction surfaces and also to afford space for lateral expansion of the resilient members 36, 36 when the device is compressed. Smooth radii are afforded at 76, 76 at the relieved portions 72, 72 and 74 to prevent abrasion of the resilient members.

The details of one of the friction shoes are shown in Figures 5, 5A and 5B, wherein it may be noted that each friction shoe 24 is of generally rectangular form presenting on one face thereof the end diagonally arranged friction surfaces 26, 26 and the intermediate oppositely directed diagonally arranged friction surface 30. It is apparent from consideration of Figure 5 that substantially all of the area on this face of the friction shoe is available for frictional engagement with the exception of the spaced notches or recesses 46, 46 and 52. The notches 46, 46 formed on opposite ends of the shoe accommodate the lugs 50, 50 on the end pedestals 16, 16. The intermediate friction face 30 is centrally interrupted along the edge opposite from the recesses 46, 46 by the notch or recess 52 which accommodates the lug 56 on the central pedestal 20 of the other follower. On the opposite face of said shoe are formed the spaced recesses 38, 38 which receive the positioning lugs 80, 80 on the resilient members 36, 36.

As load is applied to my novel device, the followers are urged toward each other and the resilient members 36, 36 are compressed between the followers and the friction shoes, said resilient members urging the friction shoes into tight frictional engagement with the complementary friction surfaces on the followers and also resisting relative vertical movement of said followers so that said resilient members are subject to deformation in two directions during relative movement of the followers. As load is released, the resilient members return the followers to their normal released position.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction absorbing device, end followers each presenting alternately arranged friction surfaces opposed to corresponding friction surfaces on the other follower, friction elements having a plurality of friction faces for complementary engagement with said friction surfaces, and resilient means abutting said followers and said elements.

2. In a friction absorbing device, end followers each presenting opposed friction surfaces alternately arranged with friction surfaces on the other follower, friction shoes each having alternately arranged friction faces for complementary engagement with certain of said surfaces on each follower, and resilient means compressed between said shoes.

3. In a friction device, friction members each presenting spaced friction surfaces opposed to corresponding surfaces on the other member and an intermediate friction face between the surfaces on the other member, friction elements each having complementary engagement with said members, and a plurality of resilient means compressed between said members and said elements.

4. In a friction device, friction members each presenting spaced friction surfaces opposed to corresponding surfaces on the other member and an intermediate friction face between the surfaces on the other member, friction elements each having complementary engagement with the friction surfaces on one member and the friction face on the other member, and a plurality of resilient means compressed between said members and said elements.

5. In a friction absorbing device, end followers each presenting friction surfaces opposed to surfaces on the other follower, friction elements each engaging certain of said surfaces, resilient means compressed between said followers and said elements, spaced interlocking means on said shoes and one of said followers, and intermediate interlocking means on said shoes and the other of said followers.

6. A follower member comprising a base having spaced upstanding end pedestals presenting diagonal friction surfaces for engagement with an associated friction shoe and an opposed intermediate pedestal presenting a diagonal friction face for engagement with another associated friction shoe.

7. In a friction absorbing device, end followers each presenting spaced friction surfaces and an opposed intermediate friction surface, friction shoes having friction faces engaging the spaced friction surfaces on one follower and the intermediate friction surface on the other follower, and resilient means abutting said shoes.

8. In a friction absorbing device, end followers each presenting spaced diagonal friction surfaces and an opposed intermediate oppositely directed diagonal friction surface, friction shoes each having complementary face engagement with certain of said surfaces on each follower, and resilient means abutting said followers and said shoes.

9. In a friction absorbing device, end followers with interlaced walls presenting oppositely directed alternately arranged diagonal friction surfaces, friction elements each having diagonal friction faces in complementary engagement with certain of the surfaces on each follower, and resilient means abutting said followers and said elements.

10. In a friction device, opposed end members presenting interlaced friction surfaces, side members each having friction faces engaging certain surfaces on each of said end members, and a resilient element compressed by and between all of said members for urging them into tight engagement.

11. A friction element presenting spaced friction surfaces for engagement with an associated member and an intermediate opposed friction face for engagement with another associated member, and means on said surfaces and said face for interlocking with the respective members.

12. A friction follower comprising a base having end friction members and an intermediate friction member laterally spaced therefrom, and means on said end members and said intermediate member for interlocking with respective associated friction elements.

13. In an energy absorbing device, opposed end followers presenting interleaved friction surfaces, friction elements each engaging certain of said surfaces on each follower, and resilient means compressed by and between said followers and said elements for urging them into tight engagement.

14. In a friction device, a follower member having spaced pedestals presenting friction surfaces for engagement with an associated friction element, and an intermediate pedestal presenting an opposed friction surface for engagement with another associated friction element.

15. A friction element of rectangular shape presenting spaced diagonal friction surfaces for engagement with an associated member, and an intermediate oppositely directed diagonal friction surface for engagement with another associated friction member.

16. In a friction absorbing device, a plurality of followers comprising interlaced friction surfaces, friction shoes in engagement therewith, and resilient means under compression between said shoes, each shoe frictionally engaging at least one surface on each follower.

17. In a friction absorbing device, a plurality of followers comprising alternately arranged and interposed friction surfaces, friction shoes in engagement therewith, and resilient means under compression between said shoes, each shoe frictionally engaging a surface on one follower and a plurality of spaced surfaces on the other follower.

18. In a friction absorbing device, a plurality of followers comprising interlaced friction surfaces, friction shoes in engagement therewith, and resilient means under compression between said shoes, each shoe frictionally engaging on one side thereof at least one surface on each follower.

19. In a friction absorbing device, a plurality of followers each comprising spaced diagonally arranged friction surfaces and an oppositely directed diagonal friction face, said face being received between the spaced surfaces on the other follower, friction shoes each in engagement with the face on one follower and the surfaces on the other, and resilient means compressed between said shoes.

20. In a friction absorbing device, a plurality of followers each comprising spaced friction surfaces and an opposed friction face, said face being received between the spaced surfaces on the other follower, friction shoes each in engagement with the face on one follower and the surfaces on the other, and resilient means compressed between said shoes.

21. In a friction absorbing device, a plurality of followers each comprising spaced friction surfaces and an opposed intermediate friction surface, friction shoes in engagement with respective surfaces, and resilient means compressed between said shoes.

22. In a friction absorbing device, a plurality of followers each comprising spaced friction surfaces and an opposed friction face, friction shoes in engagement with respective surfaces and respective faces, and resilient means under compression by and between said followers and said shoes.

23. In a friction absorbing device, a plurality of followers comprising interleaved oppositely directed diagonal friction surfaces, shoes in engagement with respective surfaces, and resilient means compressed by and between said shoes and said followers.

24. In a friction absorbing device, a plurality of friction shoes each comprising spaced diagonally arranged friction faces and an intermediate oppositely directed diagonal friction face, followers comprising friction surfaces in engagement with respective faces, and resilient means compressed between respective shoes.

25. In a friction absorbing device, a pair of followers comprising longitudinally overlapping friction elements, friction shoes each frictionally engaging a side of at least one element on each follower, and resilient means urging said shoes into said engagement.

26. In a friction absorbing device, a pair of followers each comprising friction elements longitudinally overlapping friction elements on the other, friction shoes each frictionally engaging on one side thereof a side of at least one element on each follower, and resilient means urging said shoes into said engagement.

27. A friction element of generally rectangular form presenting on one face thereof spaced friction surfaces for engagement with an associated member and an intermediate friction surface for engagement with another associated member.

28. A friction element of generally rectangular shape presenting on one face thereof spaced diagonal friction surfaces for engagement with an associated member and an intermediate oppositely directed diagonal friction surface for engagement with another associated member.

WALTER H. BASELT.